UNITED STATES PATENT OFFICE.

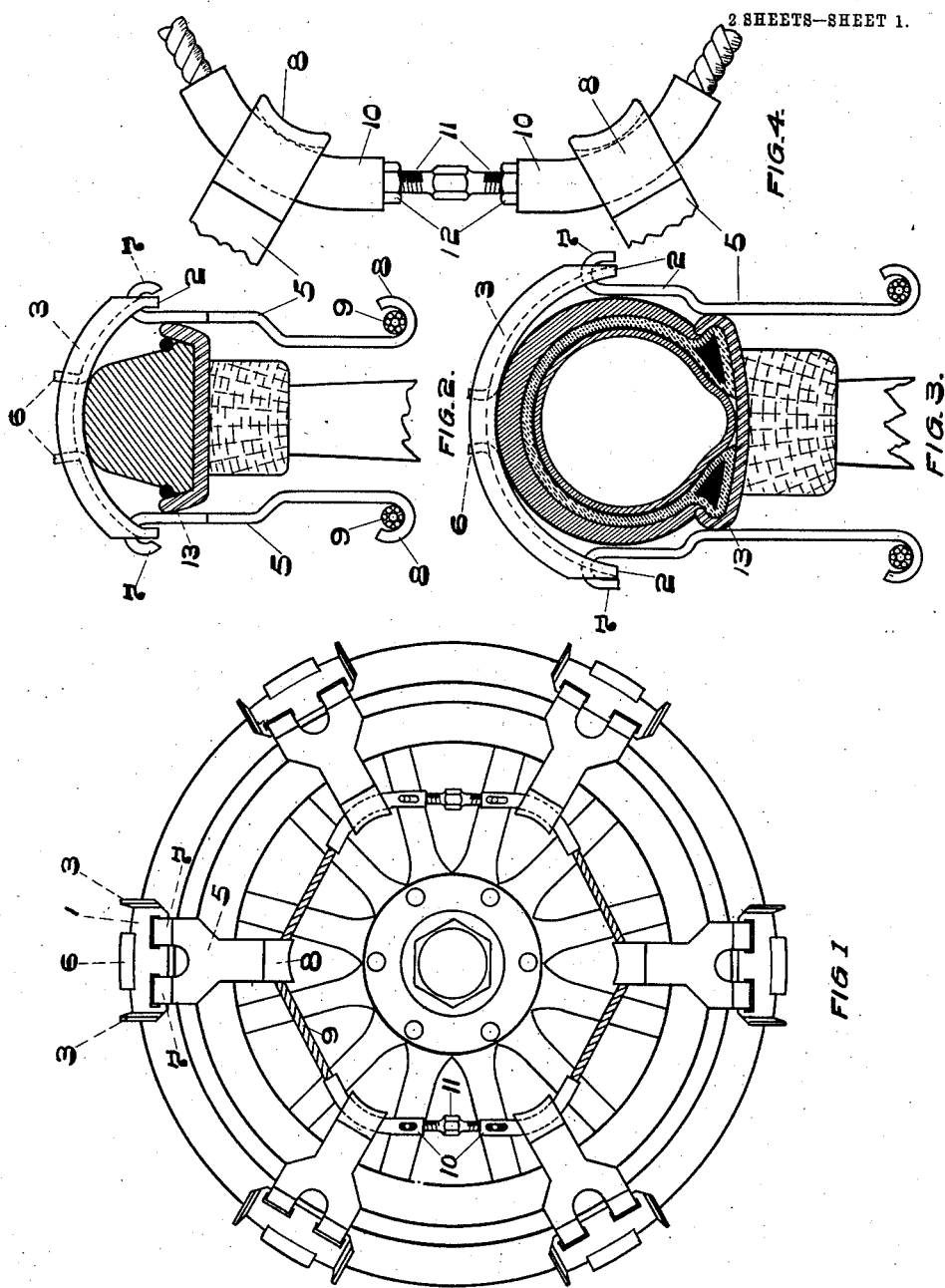

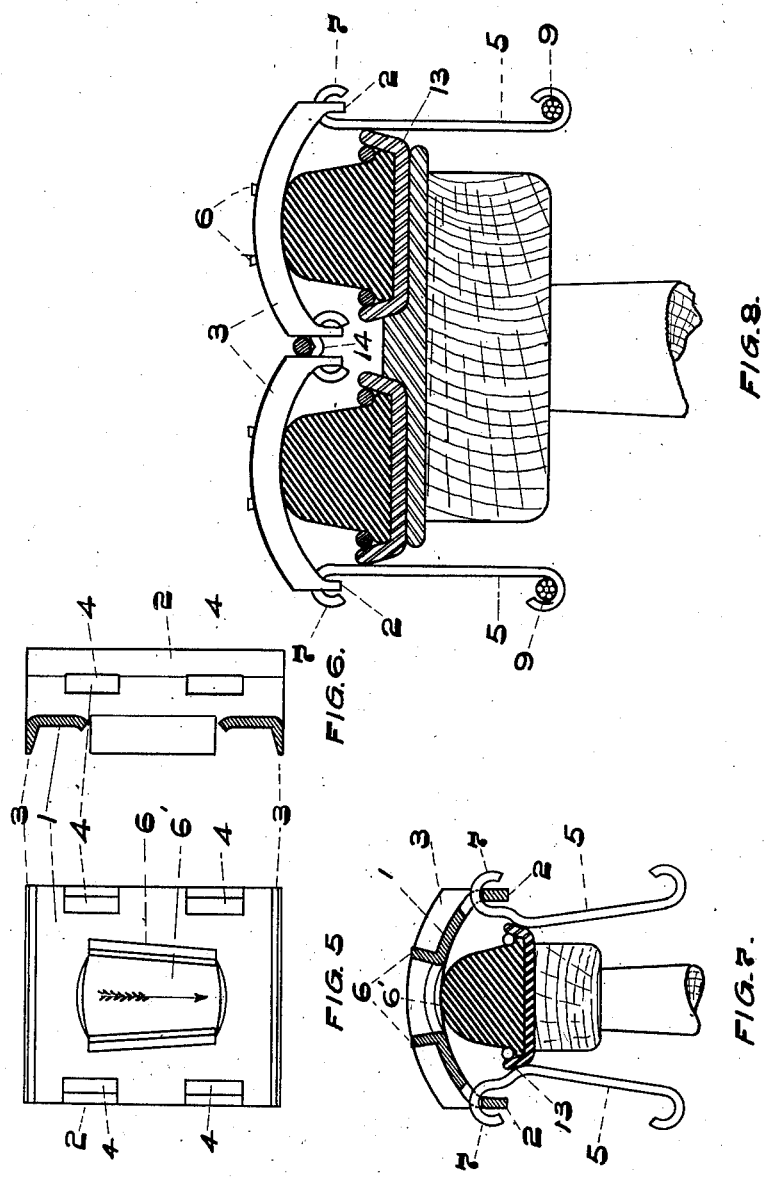

CHARLES H. MYERS, OF FRANKLIN, PENNSYLVANIA.

ANTISKIDDING ATTACHMENT FOR WHEELS.

1,016,846. Specification of Letters Patent. Patented Feb. 6, 1912.

Application filed March 20, 1911. Serial No. 615,501.

*To all whom it may concern:*

Be it known that I, CHARLES H. MYERS, citizen of the United States, residing at Franklin, in the county of Venango and State of Pennsylvania, have invented certain new and useful Improvements in Antiskidding Attachments for Wheels, of which the following is a specification.

The object, construction and operation of my improved anti-skidding attachment for wheels are herein set forth with sufficient clearness to enable those skilled in the art to which it appertains, to make and use the same.
In the drawings I have fully illustrated a certain form and application of my attachment, the various figures in said drawings being as follows:—

Figure 1 is a side elevation of a wheel equipped with my improved anti-skidding attachment. Fig. 2 is a transverse section of the rim and tire of a wheel having a solid or cushion tire, showing my attachment applied thereto. Fig. 3 is a transverse section of the rim and tire of a wheel equipped with a pneumatic tire, showing my device applied thereto. Fig. 4 shows a portion of the tension or retaining device, by means of which my attachment is secured upon a wheel. Fig. 5 is a plan view of one of the tread-plates which I employ,—the side plates being detached therefrom. Fig. 6 is a central, longitudinal section of said tread-plate. Fig. 7 is a transverse section of said tread plate, and shows the same in position upon a tire of small size. This view also shows the method of adapting my attachment to tires of various sizes. Fig. 8 shows the application of my device to a dual-tread tire.

The same reference numerals are applied to identical parts in all the views.

As clearly shown in the drawings, my improved anti-skidding attachment consists of a plate 1, which presents a convex outer face to the road surface, the inner, tire-contacting face being of concave conformation. The lateral edges of the plate are formed into inwardly-projecting flanges 2, and the ends of said plate are formed into outwardly-projecting, transverse flanges 3. In proximity to the lateral edges of said plate slots 4 are formed for the attachment of side plates 5, by means of which the tread-plates 1 are attached to the wheel. Longitudinally-extending flanges 6 are also formed upon the tread of plate 1, which flanges are preferably formed by bending a portion of the metal outward from the body of the plate, which construction forms an opening 7 in said plate. Said flanges 6 are positioned somewhat obliquely upon the plate, the obliquity of the respective flanges being in opposite directions, as illustrated in Fig. 5. In said Fig. 5 I have placed an arrow which indicates the direction of travel of the plate when in service. It will be readily understood by an inspection of this view that said center flanges 6 converge toward the end which first comes in contact with the road surface, they also have a vertical, outward divergence, as illustrated in Fig. 7, so that they will not pick up and retain earth, mud or other portions of the road traveled over.

In constructing all portions of my anti-skidding attachment, particular care has ben exercised in its design, so that it will readily and automatically free itself from mud, etc., which may adhere to it when in contact with the road surface.

The side plates 5 are formed at their upper ends into hooks 6 which engage slots 4 in the tread-plates 1. Said side plates are preferably bifurcate at the plate-engaging end, and two slots 4 are provided for the engagement of said bifurcations, which causes said plates to have a greater stability than could otherwise be secured. I do not wish, however, to be limited to the precise method shown for joining said side plates to the tread-plate 1, as other means could be employed for securing a flexible attachment at this point, without departing from the scope of my invention. The free end of plate 5 is also formed into a hook 8 for the engagement or reception of a tension device, which consists preferably of a flexible, metallic cable 9, provided with suitable means for tightening same, and causing said plates to exert a centerwise pressure upon the tire. Said tightening or tension device may be sleeves 10, internally screw-threaded at one end to receive a right hand, and a left hand screw 11 11, which, when turned in one direction, causes the approximate ends of said sleeves to approach and exert a tension upon cable 9, the respective ends of which are attached to the other ends of the sleeves 10. The tension thus exerted, causes said plates 1 to exert an inward, centerwise pressure upon the tread of the resilient tire. Lock-nuts 12 are provided for locking screws 11 in the desired position or state of tension. One or more tightening devices may be applied to cable 9 as desired.

My anti-skidding attachment may be readily adapted to be applied to tires of different widths, and by a reference to Figs. 3 and 7 it will be noted that the side-plates are off-set toward the rim of the wheel. Said off-setting, as shown in Fig. 7, is employed with solid tires of a less width than those for which the tread-plates 1 were originally intended and designed, and in this case said off-setting is for the purpose of preventing a lateral movement of said plate 1 upon the tread of the tire. In the application of my attachment to pneumatic tires, said off-setting is employed to prevent the side plates from coming in contact with the sides of the resilient portion of the tire, thus preventing the wear, damage and excoriation of the tire which would be caused if such contact were not prevented.

Plates 1 and 5 are preferably stamped of sheet metal, and may be of any size, thickness and strength that the character of the service in which they are employed may require. All edges of said plates which come in contact with resilient portions of the tires are suitably rounded, to prevent excoriation and cutting of said tires, but at the same time, said plates are so formed as to secure a maximum of clinging effect of the plates to said tires with a minimum of pressure thereon.

It will be readily noted that the construction of my tread-plate is such that its tractive action will be fully equal to its antiskidding action, the end flanges 3 being the feature which, to a great extent, prevents the revoluble slipping of the wheel and increases its tractive power. The obliquity of flanges 6 also contributes somewhat to said tractive action, though the action of said flanges is largely an anti-skidding one.

The relative position, and opposing obliquity of flanges 6, is an important feature of my tread plate, for the following reasons which have been previously alluded to:— Plate 1 is placed upon the wheel so that its forward travel carries it in the direction indicated by the arrow in Fig. 5 and this causes the more approximate ends of flanges 6 to first come in contact with the ground, hence, a revoluble slip of the wheel, or a tendency thereto, will not cause the space between said flanges to become packed with road surface, as would be the case if said flanges were parellel, or the convergence extended in the opposite direction. As previously stated, said obliquity contributes to the tractive action of my device, while acting directly as the anti-skidding element thereof.

In Fig. 8 I have shown how my anti-skidding attachment may be applied to dual tread tires, and the method of attachment here illustrated is as follows:—Two plates 1 are joined by means of a hook 14 and a wire or cable of suitable diameter is passed around the wheel upon the outside of said hooks, and engages the hooks of all the plates upon the wheel. The usual side-plates 5 are employed upon the outside of the wheel and the tension device shown in Figs. 1 and 4 is employed for securing the device in position. One set of plates could be used upon a dual tread tire, instead of two, as shown, and in this case a very short side plate of much the same construction as hook 14 would be employed with a suitable tension device.

The side-plates 5 are identical in construction, are readily removable and interchangeable and may be separately renewed if necessary, and the tread-plate 1 may be renewed if necessary without discarding either of the side plates.

The device may be readily folded into a compact package for transportation when not in use or for storage or shipment.

I claim:—

1. In an anti-skidding attachment for wheels, a tread-plate, oblique, relatively diverging flanges and transverse flanges upon the outer face of said plate, longitudinal, inwardly-extending flanges at the lateral edges of said plate, there being slots through said plate, in proximity to said lateral flanges, side-plates bifurcate at one end thereof and formed at the extremity of said bifurcations into hooks arranged to engage said tread-plates through said slots, and a flexible tension device exerting a tension upon said plates in the direction of the center of the wheel.

2. In an anti-skidding attachment for wheels, the combination with the wheel of a self-propelled vehicle of a tread-plate, oblique, relatively-diverging flanges upon the tread of said plate formed by carrying a portion of the metal thereof outward, thus leaving an opening in the plate between said flanges, inwardly-extending flanges upon the lateral edges of said plate, a sideplate upon either side of said tread-plate, bifurcate at one end and flexibly joined at said end to said tread-plate in proximity to said inwardly-extending flange, said side-plate being off-set, for the purpose of bearing against the metallic member of the rim of said wheel, the inner end of said side-plate toward the center of the wheel being formed into a hook for the engagement of a retaining cable, a retaining cable engaging said plates and screw-actuated means adapted to exert tension upon said cable for the purpose of drawing said plates toward the center of the wheel.

In testimony whereof I affix my signature in presence of two witnesses.

CHARLES H. MYERS.

Witnesses:
  H. G. JOHNSON,
  C. M. SMITH.